E. TJENALL.
SAW.
APPLICATION FILED MAY 21, 1920.
1,429,549.
Patented Sept. 19, 1922.
Fig. 1.
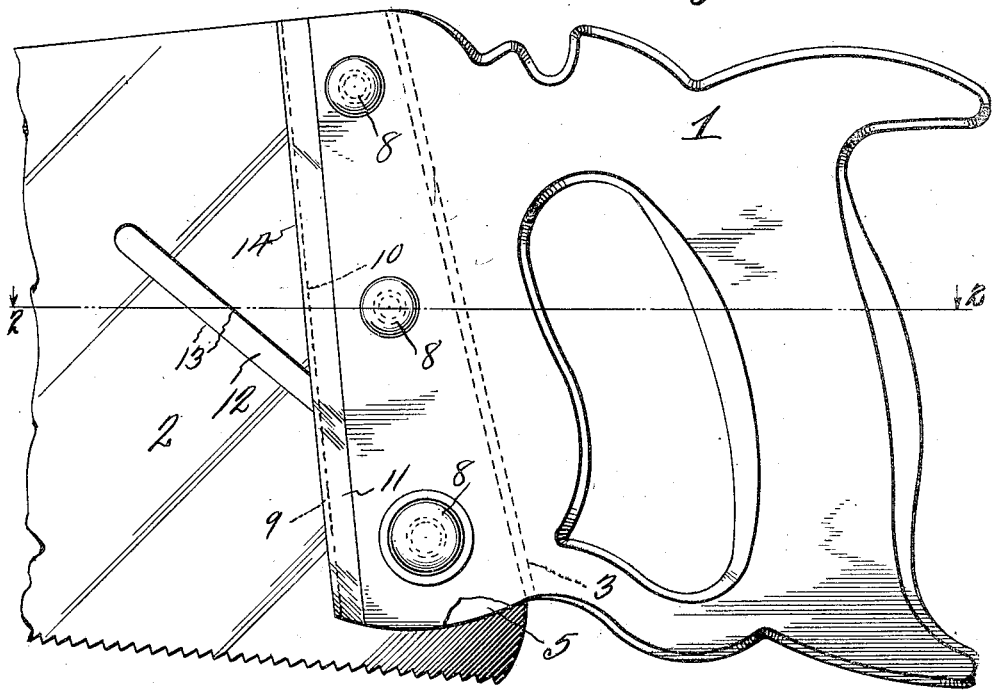
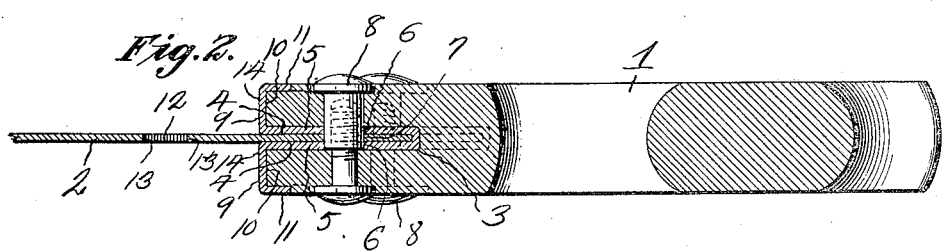
Fig. 2.
Erick Tjenall
INVENTOR.
BY
ATTORNEY.

Patented Sept. 19, 1922.

1,429,549

UNITED STATES PATENT OFFICE.

ERICK TJENALL, OF OMAHA, NEBRASKA.

SAW.

Application filed May 21, 1920. Serial No. 383,165.

*To all whom it may concern:*

Be it known that I, ERICK TJENALL, a citizen of the United States, residing at Omaha, in the county of Douglas and State of Nebraska, have invented certain new and useful Improvements in Saws, of which the following is a specification, reference being had therein to the accompanying drawing.

The invention relates to saws and has for its object to provide a saw provided with a slot in the blade thereof at an angle to the handle edge, so that the handle edge in connection with the slot may be disposed in such a position that the saw may be used as a square, the slot preferably disposed at the common angle of forty-five degrees, which angle is used a great deal. Also to provide a metallic binding which may be brazed to the rear end of the saw blade and adapted to be received in a slot in the saw handle so that the blade may be rigidly held in such a manner that the angle slot will be accurate at all times, said metallic binding being provided with angle flanges engaging the edges of the handle on each side of the blade for additionally bracing the same.

With the above and other objects in view, the invention resides in the combination and arrangement of parts as hereinafter set forth, shown in the drawings, designated and claimed, it being understood that changes in the precise embodiment of the invention may be made within the scope of what is claimed without departing from the spirit of the invention.

In the drawings:—

Figure 1 is a side elevation of the saw handle and a portion of the blade, and

Fig. 2 is a sectional view taken on line 2—2 of Fig. 1.

Referring to the drawings, the numeral 1 designates the saw handle and 2 the saw blade. The saw handle is provided with a kerf 3 in which kerf the blade 2 is secured. The rear end of the saw blade has secured thereto by brazing as at 4 reinforcing plates 5, which plates are received in the kerf 3 and are provided with apertures 6, which register with apertures 7 in the blade 2, through which registering apertures securing bolts 8 pass for securely holding the saw blade and its reinforcing plates in the kerf.

The outer edges of the plates 5 are provided with outwardly extending flanges 9, which flanges engage the edges 10 of the handle and maintain the blade at an exact angle to said edges 10. Flanges 9 also prevent the handle, which is wood, from becoming dented and broken incident to the saw being used as a square, the edges 10 being at a right angle to the back edge of the saw blade. To additionally brace the saw handle and the hold the blade against movement in the saw handle, flanges 11 are provided on the flanges 9, which flanges 11 overlie the outer faces of the handle. The blade 2 is provided with a slot 12, the edges 13 of which are parallel to each other and are preferably disposed at a 45-degree angle to the edges 14 of the saw handle 1. By placing either of the edges 14 in engagement with a piece of material, it will be seen that the operator can easily and quickly mark a line at 45 degrees to the edges 14, thereby eliminating the necessity of using a square for this common angle.

From the above it will be seen that a saw is provided which may be used as a square or for a common angle which is used a great deal, and it will also be seen that a reinforcing member or blade holder is provided, which will prevent the blade from becoming displaced in relation to the handle so that the angle of the slot 12 would not be true.

The invention having been set forth what is claimed as new and useful is:—

The combination with the rear end of a saw blade disposed within a kerf of a handle, of a reinforcing plate for said blade and handle, said plate comprising a member bent to form parallel portions rigidly secured to the opposite sides of the sawblade and having a transverse portion engaging the rear edge of the blade, said parallel portions merging into outwardly and rearwardly extending members engaging the forward edges of the saw handle to each side of the kerf and means for securely holding the reinforcing plate in the kerf of the handle.

In testimony whereof I hereunto affix my signature.

ERICK TJENALL.